L. SYKES.
THROTTLE VALVE HANDLE FOR PNEUMATIC DRILLS, HOLDERS-ON, AND OTHER APPLIANCES.
APPLICATION FILED JAN. 2, 1919.
1,339,426. Patented May 11, 1920.
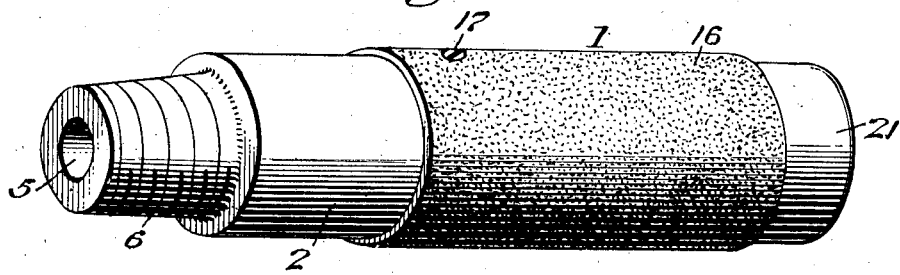
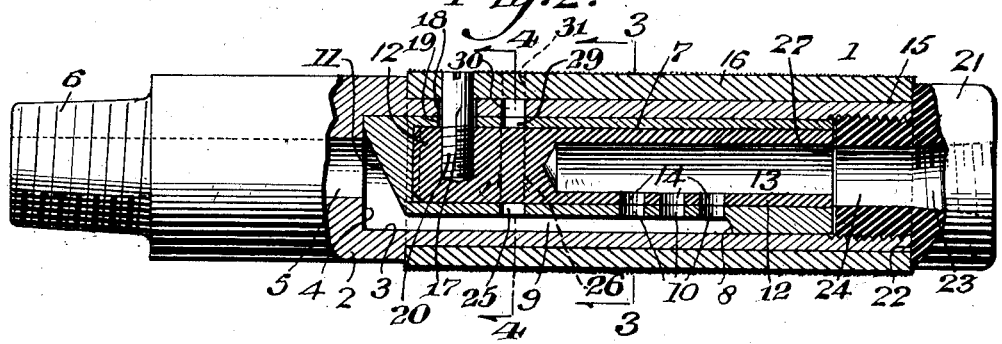
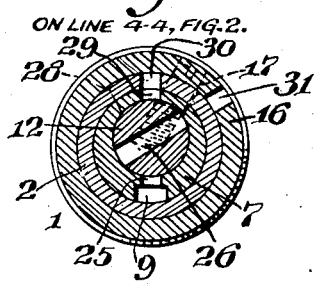
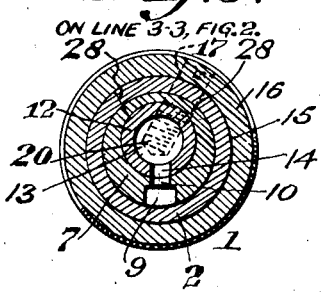
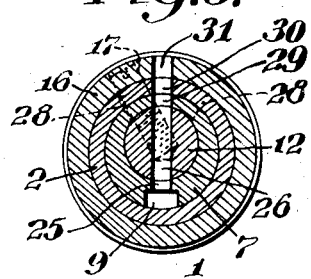
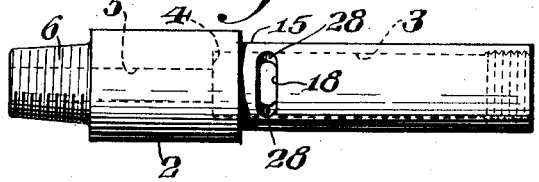
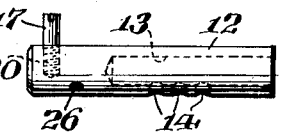
INVENTOR
Lewis Sykes.
BY
ATTORNEYS

UNITED STATES PATENT OFFICE.

LEWIS SYKES, OF CAMDEN, NEW JERSEY, ASSIGNOR, BY DIRECT AND MESNE ASSIGNMENTS, TO KELLER PNEUMATIC TOOL COMPANY, OF GRAND HAVEN, MICHIGAN, A CORPORATION OF MICHIGAN.

THROTTLE-VALVE HANDLE FOR PNEUMATIC DRILLS, HOLDERS-ON, AND OTHER APPLIANCES.

1,339,426.  Specification of Letters Patent.  Patented May 11, 1920.

Application filed January 2, 1919. Serial No. 269,256.

*To all whom it may concern:*

Be it known that I, LEWIS SYKES, a citizen of the United States, residing at Camden, county of Camden, State of New Jersey, have invented a new and useful Throttle-Valve Handle for Pneumatic Drills, Holders-On, and other Appliances, of which the following is a specification.

In conveying motive fluid, such as compressed air, to pneumatic drills, pneumatic holders-on and the like, it has been the custom to provide the inlet pipe through which the compressed air passes with a rotary sleeve, which usually has a diagonal slot therein, the walls of which slot serve as a cam groove to engage a pin connected with an internal rotary valve of various types, whereby the inlet of the motive fluid is controlled at will by the rotation of the exterior sleeve.

The diagonal slot heretofore employed in devices of this character is objectionable, as it is liable to become filled with dirt and sand, in use around shipyards, boiler plants and the like where these implements are used, and, in addition, the presence of the slot and the pin therein is uncomfortable to the operator's hand.

It has heretofore been proposed to employ a sleeve which is connected to a valve so that upon the rotation of the sleeve the valve will be rotated to control the passage of the admission of motive fluid through the throttle valve handle. These sleeves often become broken and when this occurs the throttle valve handle is rendered inoperative.

To obviate the foregoing objections, I have devised a novel construction of inlet valve and its adjuncts for the inlet pipe of a pneumatic tool, such as a drill, holder-on and the like, wherein the entire exterior periphery of the rotary sleeve is continuous and unobstructed and the internal valvular construction is such that a very quick, efficient and reliable device is produced which cannot readily get out of order and which will last indefinitely in spite of the hard usage to which tools of this character are subjected.

In accordance with my present invention the throttle valve handle is still operative even if the controlling sleeves become broken or are removed.

To the above ends, my invention consists of a novel throttle valve for pneumatic drills, holders-on and other appliances, the novel features of which will be hereinafter set forth.

For the purpose of illustrating my invention, I have shown in the accompanying drawing a typical embodiment of it which in practice will give satisfactory and reliable results. It is, however, to be understood that this embodiment is typical only and that the various instrumentalities of which my invention consists can be variously arranged and organized and that my invention is not limited to the precise arrangement and organization of these instrumentalities as herein set forth.

Figure 1 represents a perspective view of a throttle valve embodying my invention.

Fig. 2 represents a longitudinal sectional view of Fig. 1.

Fig. 3 represents a section on line 3—3 of Fig. 2. Fig. 4 represents a section on line 4—4 of Fig. 2.

Fig. 5 represents a sectional view similar to Fig. 4 but showing certain parts in a different relation from that seen in Fig. 4.

Figs. 6 and 7 represent side elevations of details.

Similar numerals of reference indicate corresponding parts in the figures.

Referring to the drawings, 1 designates my novel construction of pneumatic implement valved handle, the same comprising the body portion 2, which is provided with an internal longitudinally extending chamber or bore 3, which is open or uninterrupted throughout its entire length, having a terminal wall 4 from which leads the passage 5 for conveying the motive fluid to the implement, as an air drill, holder-on or the like, one end, as the left-hand of said body, being of reduced diameter and provided with the screw threads 6 for screwing into the drill or holder-on casing.

Within the chamber 3 I locate the stationary sleeve or valve casing 7, which has a driving fit in said chamber and is provided with a flattened or cut-away portion terminating at 8, whereby the longitudinal inlet passage 9 is produced, said sleeve being provided with the inlet ports 10, and the forward or left-hand portion of said sleeve is cut away at an angle, as indicated at 11 at the left of Fig. 2, so as to permit the motive fluid to flow in a continuous and unobstructed manner through the passage 9 to the outlet passage 5.

The sleeve 7 is axially and longitudinally bored from a longitudinally extending valve chamber, in which is contained the rotary valve 12 having the inlet passage 13 extending from the right-hand end thereof interiorly to about the extent indicated in Fig. 2, said inlet passage having the ports 14, which are adapted to register or aline with the ports 10 when the valve is open, as indicated in Fig. 2. The outer wall of the body 2 is of reduced diameter or provided with an annular recess, as indicated at 15, and carries thereon a rotary sleeve 16, in which is secured an end of the pin 17, the latter passing through slots 18 and 19 and having its end threaded, as indicated at 20 and in threaded engagement with the solid portion of the valve body or member 12, so that when the sleeve 16 is rotated, the valve block 12 rotates in unison with it and the ports 14 will be moved into or out of alinement with the ports 10.

The outer or right-hand end of my novel valve is finished by the provision of the plug 21 which is in threaded engagement with the body portion 2, and whose shoulder 22 abuts against the ends of the sleeve 16 and the end of the body 2, said plug having the threaded inlet passage 23 therein, which communicates with the passage 24, which is at all times open to the longitudinal chamber 13 of the valve block 12. The end wall 27 of the plug 21 may abut against the end of the sleeve 7 when the parts are assembled as seen in Fig. 2.

I preferably roughen the exterior surface of the sleeve 16 so that the same can be readily grasped in the hand of the user and rotated, and it will be apparent that the slots 18 and 19 extend circumferentially through the stationary members 2 and 7 to the desired extent, so that the rotation of the sleeve 16 will move the ports 14 into or out of alinement with the ports 10 to the desired extent during the opening and closing of the valve, so that said ports 10 will be opened or closed to the desired extent.

The supply hose is secured to the threaded portion 23 at the right of the valve and the threaded end 6 is secured in the casing of the pneumatic drill, holder-on or other implement to which it is desired to control the flow of the motive fluid.

It will be seen from the foregoing that in my device there is no slotting of the outer sleeve 16 and that the entire outer periphery thereof is contiguous and unbroken, so that the same will feel comfortable at all times to the workman's hand.

The valve block 12 while fitting nicely and snugly within the sleeve 7 is capable of being freely rotated therein and the sleeve 16 is also freely rotatable upon the body 2. The sleeve 7, however, is immovable or stationary within the body 2 having preferably a drive fit therein, the parts being held in assembled position by means of the outer plug 21.

The foregoing device as above described is particularly adapted for use with pneumatic, rotary, or reciprocating motors which are employed for drilling or reaming purposes, and in case the device is employed for a pneumatic holder-on, I provide the release vent or port 25, which is adapted to register with the passage 26 in the plug 12 and place it in communication with ports 29, 30 and 31 seen in Figs. 4 and 5 for the purposes of permitting exhaust of the motive fluid when desired when the device is connected to a holder-on casing.

It will be understood that when the valve is in closed position the release port 25 would be in communication with the atmosphere. In throttle valve handles for drills, this release port 25 may be dispensed with.

It will be apparent that when a throttle valve is constructed in accordance with my present invention it will still be operative even if the controlling sleeve becomes broken or removed since the operator can manipulate the pin 17 with his thumb or finger.

It will be apparent that in accordance with my present invention the rotatable valve sleeve has an extended wearing surface around and about the slots so that the wear of the sleeve is reduced to a minimum in proximity to the slots and the limiting pin 17, the movement of which is limited by the walls 28 of the stationary sleeve 7 and the body portion 2.

It will be seen that the sleeved valve is eccentrically mounted in the valve casing and has connected to it a pin which has limited rotation with respect to the valve casing and body. The pin is preferably connected to a sleeve rotatable on the body but if desired this can be omitted and the valve can be controlled by the thumb and fingers of the user by pressing against the pin.

It will be understood by those skilled in this art if the throttle valve handle is connected to a holder-on that when the handle is turned into such position that the ports 14 and 10 are out of register then the air in the passages 9 and 5 is free to exhaust to the atmosphere through the ports 25, 26, 29, 30 and 31, respectively, so that the holder-on can be moved rearwardly away from the work.

It will now be apparent that I have devised a novel and useful construction of a throttle valve handle for pneumatic drills, holders-on and other appliances which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A throttle valve handle, comprising a body portion having a bore which is uninterrupted throughout its entire length and having its rear end extending through the rear end of said body portion, said body portion having an aperture which leads into the forward end of said bore, a valve casing arranged within said bore and held stationary therein and having a portion of its side wall cut away to provide a passage which communicates with said aperture, said valve casing having ports which communicate with said passage, a cylindrical valve rotatable in said valve casing, said valve having a longitudinal bore and ports adapted to register with the first named ports, a pin engaging said valve and extending to the exterior of the body portion and having a limited rotation with relation thereto, an apertured plug secured to the rear end of said body portion and engaging the valve to prevent displacement thereof, and a manually actuated sleeve rotatable on said body portion and having connection with said pin.

2. A throttle valve handle, comprising a body portion having a bore which is open throughout its entire length, said bore extending through the rear end of the body portion, said body portion being provided with an aperture which leads into the forward end of said bore, a valve casing arranged within said bore and held stationary therein, said valve casing having a portion of its side wall cut away to provide a passage which communicates with said aperture, said valve casing having ports communicating with said passage, a valve rotatable in said valve casing and having a longitudinal bore and ports having communication with said bore and adapted to register with the first named ports, a pin engaging said valve and extending to the exterior of the body portion and adapted to have a limited rotation with relation to the body portion, a manually actuated sleeve rotatable on said body portion and having connection with said pin, said valve casing and valve being provided with exhaust ports which are adapted to communicate with said passage.

3. A throttle valve handle, comprising a body portion provided with a longitudinal bore which is open throughout its entire length and extends through the rear end of said body portion, said body portion having an aperture which leads into the forward end of the longitudinal bore, a valve casing arranged within the longitudinal bore and clamped therein to be held stationary with relation to said body portion, said valve casing being provided with a longitudinal bore and ports which communicate therewith, said valve casing having its side wall and forward end cut away to form a passage which communicates with said aperture and said ports, said body portion and valve casing being provided with circumferentially extending slots, a valve rotatable in the valve casing and provided with a longitudinal bore and having ports communicating therewith and adapted to communicate with the first named ports, a plug connected with the rear end of the body portion and provided with an aperture having communication with the longitudinal bore of the valve casing, a sleeve rotatable upon said body portion, and a pin affixed to said sleeve and extending through said slots and connected with said valve to turn the valve.

4. A throttle valve handle, comprising a body portion having a longitudinal bore which is open throughout its entire length, said bore being provided near one end of the body portion with a shoulder, a valve casing having a driving fit within the bore of the body portion and held stationary therein, said valve casing being provided with a longitudinal bore and laterally extending ports communicating therewith, said valve casing having one side thereof cut away to provide a longitudinal passage in communication with said ports and the end portion of the bore of the body portion, a valve rotatable within said valve casing and provided with a longitudinal bore and laterally extending ports adapted to register with the first named ports, a tubular plug connected with the rear end of the body portion and engaging the valve, a rotatable sleeve arranged upon the exterior of the body portion, and means connecting the sleeve and valve so that they turn together.

LEWIS SYKES.

Witnesses:
J. W. MEEKER,
WM. A. KREUSSER.